Patented May 24, 1938

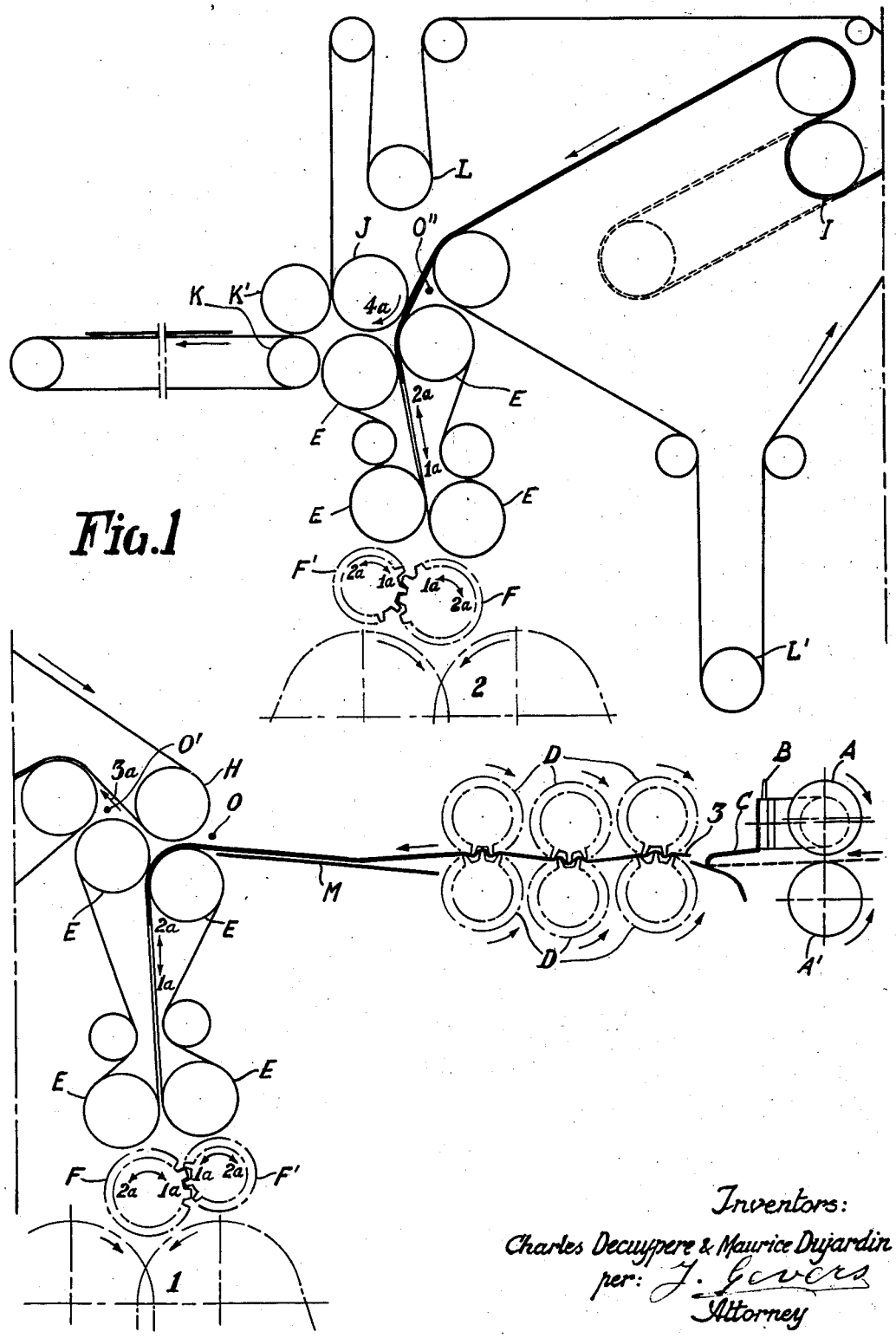

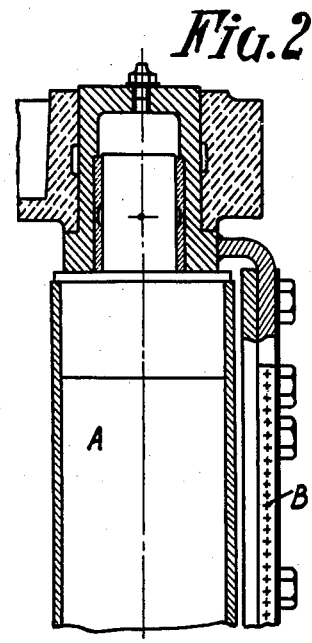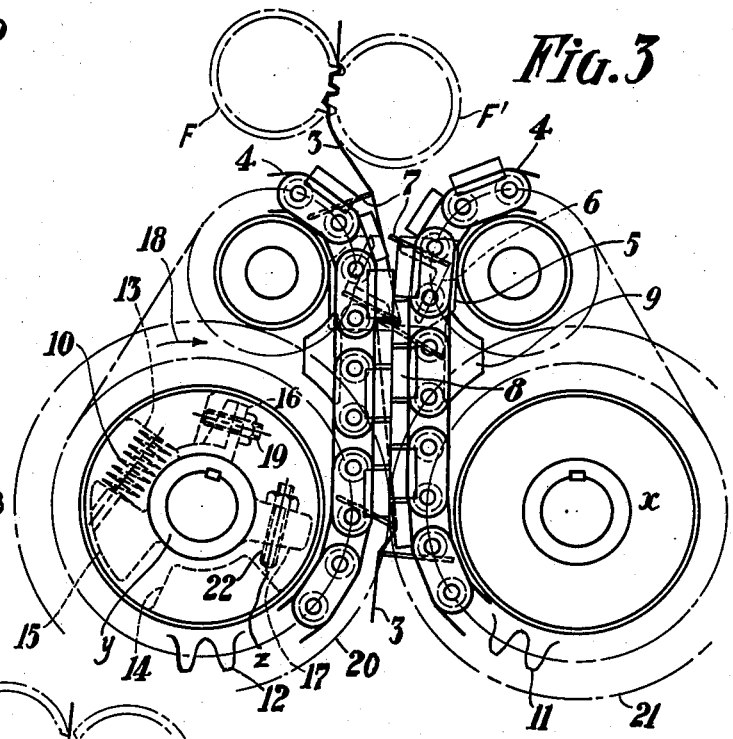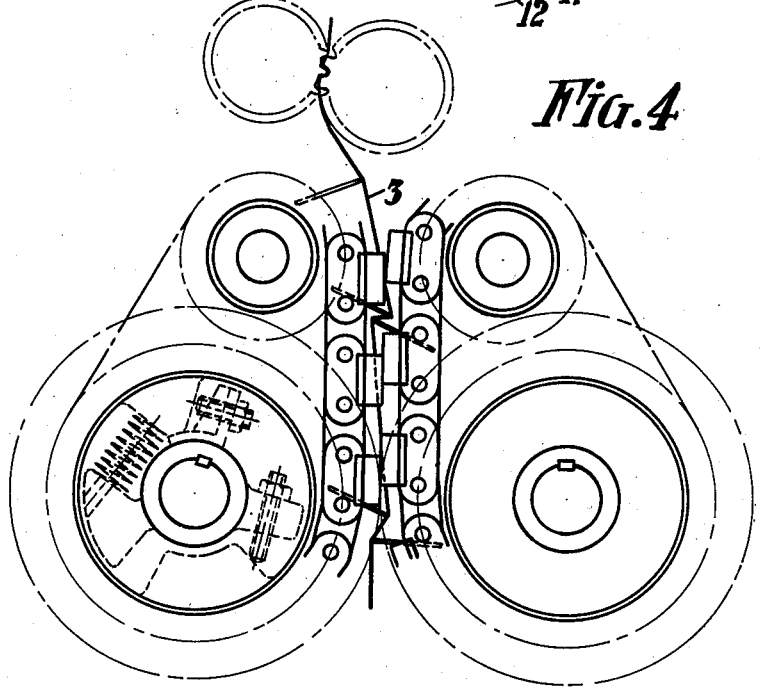

2,118,071

UNITED STATES PATENT OFFICE 2,118,071

PROCESS AND MACHINE FOR SCUTCHING FLAX AND THE LIKE

Charles Decuypere, Rekkem, and Maurice Dujardin, Lauwe, Belgium

Application March 29, 1935, Serial No. 13,702

4 Claims. (Cl. 19—19)

The present invention has for its object the construction of a machine performing mainly the scutching of flax and the like according to a new method, and to construct such a machine so that complementary operations can be performed upon the material, such as rippling, breaking and subsequently the removal of the ligneous portion which is coated with the fibres of textile plants, the latter being retted or not, i. e. being in a green or raw condition.

The new process of scutching consists in submitting the stalks of flax and the like which have been previously broken according to known methods and arranged in a flat layer, to the action of scutching blades which move parallel to each other at the same speed and which are arranged at an angle with respect to the direction of movement, said blades overlapping each other partially and in an adjustable manner, so as to deviate the layer of flax angularly. By the formation of such angle, the hard portions are not allowed to follow the supple portions, namely the fibres, and the hard portions will project from the layer under a certain angle, and under the friction of the blades such ligneous hard elements will be removed.

A complete machine according to the invention comprises, besides the two scutching apparatus working according to the process, a device capable of feeding the layer formed by the stalks of flax or the like respectively to each of the scutching apparatus, so that said stalks may be submitted to the action of the blades over one half at least of the stalks and namely first upon the half portion adjacent to the roots and afterwards upon the half ending at the opposite end, or inversely.

Such complete machine will moreover comprise a feeding device which will comprise a rippling apparatus, and behind this feeding means will be preferably arranged the fluted breaking rollers.

In order that the invention may be well understood, one form of embodiment will be described hereafter by way of example and with reference to the accompanying drawings.

Fig. 1 is a diagrammatic side elevation of the whole of the machine;

Fig. 2 illustrates the rippling device and the feeding means shown in horizontal section;

Fig. 3 is a side elevation of one of the scutching apparatus forming part of such machine;

Fig. 4 is a similar view to that of Fig. 3 showing the effect of the automatic adjustment of the scutching apparatus.

With reference to these drawings, the material to be treated is introduced in the form of a layer between the rollers A, A', one of which, for instance that A', may be a roller coated with rubber. Around the axis of the roller A is arranged the rippling comb B, capable of being rotated about the axis of the roller A, so that the comb B comes in contact with the roller A'.

The roller A is slightly eccentric, so that by rotating the rippling comb B over at least one half of a revolution, the roller A comes in contact with the roller A', so that the flax or like material to be scutched will be pressed between said rollers and will be moved towards the breaking rollers D.

The normal distance between the rollers A and A' is adjusted in such a manner that in the open position, namely before introducing the layer of flax, the stalks will be only slightly compressed, so that they may be brought automatically and in a uniform manner up to the end of the limit bar C.

The latter thus exactly controls the starting of the layer of stalks. Such arrangement of the stalks is necessary to secure a starting motion from one and the same line and at a given predetermined moment, namely at the end of the tilting movement of the rippling device, which brings its points or combs B close to the rubber roller A'. This tilting movement causes the layer to pass through the rippling comb, so that the stalks are combed and erected, and they further progress between the rollers while at the same time the seed is pulled from the ends of the stalks.

The pressure produced by the eccentricity of the roller A is sufficient, during the tilting movement of the rippling device, to secure the required adherence to make the layer of stalks progress between the rollers. This tilting movement moreover frees the stalks from the limit bar C and moves such stalks between a succession of breaking rollers D, in order that the flax may be submitted there to the action of breaking the ligneous portion.

Leaving the breaking rollers, the stalks progress along the guiding plane M, and when their forward ends reach the point O, the rollers E start rotation in the direction of drawing in, i. e. in the direction of the arrow $la$, so that the stalks will be drawn between two endless conveyers, substantially linen bands passing between the rollers E and stretching rollers, so that said stalks, while moving, become engaged between the pressure rollers F, F', of which the teeth or grooves are capable of retaining the layer by friction. These pressure rollers rotate in conjunction with and in the same direction as the rollers E, the drive of said different rollers being transmitted from the main general drive of the machine, according to technical elements of known construction.

The length of engagement of the layer between the rollers F, F' is adjustable and when the layer is engaged between said rollers, the outwardly projecting portion of the stalks is engaged between the movable scutching blades of two scutching apparatus designated by 1 in Fig. 1, and the layer of flax is acted upon said portion according to the process mentioned. At a given moment, namely after a sufficient delay for the removal of the main portion of the ligneous element of the layer, a return movement is produced in the pressure rollers F, F', as also in the rollers E and namely in the direction of the arrow 2a. Such return movement can only be made at the moment when the rear end of all the stalks of the layer will have transgressed the point O. During this return movement, the stalks abut against the roller H and they are moved in the direction of the arrow 3a, between two endless belts so as to move over the distance O', O''. This movement has for result to reverse the direction of the stalks of the layer, which means that the end which was firstly in front is now at the rear with respect to the direction of movement. The distance O', O'' is adjustable by means of the movable roller I and in such a manner that, at the beginning of the following drawing in movement, the end of the stalks reaches nearly to the point O'', to be then treated in the same manner as the other half of the stalks within the first scutching apparatus, and by acting now upon the other part of the stalks within the second scutching apparatus designated by 2 in Fig. 1. In each of the scutching apparatus 1 and 2, will thus be preferably treated the half of the stalks plus a distance variable according to other circumstances, such as the quality, the kind of fibres and the like. In this scutching apparatus 2, which also comprises pressure rollers F, F', the material treated at the return movement becomes engaged against the roller J, which rotates in the direction of the arrow 4a and from there, the layer entirely treated passes between the rollers K, K'. K' is a pressure roller, and an endless belt passes over the roller K to convey the finished product to the place from where it is removed. L and L' designate stretching rollers for the conveying and reversing bands arranged intermediate the two apparatus 1 and 2.

In known scutching apparatus, the principle of working consists in treating the stalks under a free angle with blades or knives rotating or moving rapidly, so that the stalks are whipped and that the ligneous portions are expelled; in these apparatus the blades nearly always beat the stalks starting from the central portion and this explains that when treating a rigid or wet material, an entangling and interhooking of the fibres occurs.

According to the new process, the stalks of flax or the like will thus be treated by means of blades moving and arranged so as to impart an angular deviation within the layer of stalks, said deviation remaining constant for all the linear speeds of the blades, and thus the scutching will be performed as well at slow as at high speeds.

According to the invention, the blades thus move in the direction of the stalks of the layer held between the pressure rollers, and the movement of the blades will be preferably in parallel lines, but said blades will be arranged under a certain angle with respect to the direction of movement and they will overlap each other over such a distance that an angular deviation is caused within the layer of stalks. The blades thus move downwards, whereas there is imparted to the layer of flax successively a downward movement followed by an upward movement. The speed of the blades is much higher than that of the layer and consequently a friction will be produced upon the stalks.

There will thus be two series of blades moving in the same direction, the one in front of the other, in contact or at a short distance from each other, such distance being moreover adjustable in an automatic or other manner. The distance between the successive blades is necessary to prevent a breaking of the stalks in certain cases.

The means for automatically adjusting said distance of the blades within the scutching apparatus will thus have for effect to pull the blades of one series backwards.

The new process furthermore presents the advantage that always very short lengths of the stalks are successively submitted to the action of the blades and such lengths always constitute a short end of the total portion to be treated upon the stalk. Such lengths are adjustable by changing the ratio of speed between the drawing in operation and the linear speed of the blades. The more the drawing in of the flax is made slowly, the shorter will be the ends which are at a time acted upon by the blades. This prevents an entangling of the fibres with the ligneous portions and prevents a breaking or rupture of the fibres which will always be delivered by the machine without any damage and in the form of a uniform and complete staple.

According to the process, the treatment or scutching operation thus always starts no longer from the central portion of the stalks but from the end portions thereof except the distance tolerated by the automatic adjustment.

A particular feature of the process consists in the fact that a constant angle of deviation is kept over the whole length of the stalks under treatment between the moving blades.

Referring to Fig. 3, the layer of flax 3, held between the pressure rollers F, F', is engaged between two series of blades 7, fixed by means of an angle-iron 6, the ends of which are welded or otherwise united to plates 5 fixed to the chain 4 of which two pairs constitute the driving means for the blades running over chain pinions. The two series of blades 7 constitute what may be called two cooperating mills x, y. The action of the blades is produced during their inner rectilinear and parallel passage, such as illustrated, and such rectilinear and associated movement of the blades may be obviously driven by other mechanical means.

In their rectilinear stroke the chains are guided by projecting elements 8 and fixed guiding pieces 9, and moreover in this rectilinear stroke the blades have a determined angle with respect to the plane of movement, said angle remaining constant during the time that the layer 3 is worked upon by the blades.

The invention thus provides also for the automatic adjustment of the distance between the successive blades, according to the conditions of the material under treatment.

Fig. 4 illustrates the scutching apparatus in action, i. e. with a space automatically produced between the blades of the two mills x, y. This automatic adjustment results therefrom that in one of the mills, that y, the driving of the endless chains is made by a resilient coupling adjustable in itself and which will be described hereafter.

In opposition with the chain wheels 11 of the mill x, which are both feathered upon their shaft, the two chain wheels 12 of the mill y are provided with two cams or abutments 13 and 14 and are freely mounted upon their shaft and their drive is secured by means of two separate elements, each comprising three cams 15, 16, 17, said elements being feathered upon the same shaft as the chain wheels and mounted so that the cams of the wheels and those of the drive elements are in front of each other.

A helical spring 10 is arranged between the cam 13 of wheel 12 and the cam 15 of the driving element and acts to space these two cams apart. Owing to the fact that the drive elements 15, 16, 17 cannot be moved with respect to the shaft, the two free chain wheels 12 will be caused to move namely in the direction of the arrow 18. Such movement is limited by the set screw 19.

As two toothed wheels 20 and 21 constitute the mechanical connection between the shafts of the mills $x$, $y$, it results from said angular movement a linear movement of the blades of the mill $y$ with respect to the blades of the mill $x$.

When these blades are already in contact with each other and the cam 13 does not yet engage the set screw 19, a pressure will result therefrom between the blades of the mills $x$ and $y$ (Fig. 3).

The effect described herebefore is actually produced when the scutching apparatus runs idle or when fibres are treated therein which are considerably weakened down.

When now a fresh supply of material to be treated is drawn in between the mills, a more or less considerable traction results therefrom upon the blades of the mill $y$ and when such tractive force becomes higher than the compression resistance of the helical springs 10, the latter will be compressed and consequently the two free chain wheels turn back with respect to their axis and consequently also with respect to the lower blades of the mill $x$ (Fig. 4).

A set screw 22 limits such backward movement.

The springs 10 are so calculated that when the flax starts its upward movement, the fibres being then considerably weakened, they may be sufficiently strong to bring the blades against each other as illustrated in Fig. 3. The greater the distance $z$ (Fig. 3) between the cam 14 and the screw 22, the greater will be the backward movement of the blades, but this maximum of backward movement will always remain dependent upon the resistance and the hardness of the material under treatment.

It is easily understood that the speed of movement of the blades may be varied while always securing the same effect of expelling the ligneous portions for all kinds of stalks to be treated.

Obviously, the machine could have no breaking rollers D and it is also understood that the reversing in the direction of movement of the layer of stalks may be performed by other means.

In Fig. 3, the deviation in the stalks is made at a sharp angle, but it is understood that other angles may be imparted to the stalks, in accordance with the material to be treated and the result aimed at.

Scutching flax is always detrimental with respect to quality as well as to the amount of long fibres when it is performed in dry weather. As the new machine may be mounted upon a carriage so that scutching may be performed on the field where the flax has been grown, the scutching being done in all weathers, a wetting apparatus may be easily mounted upon the machine, preferably upon the table for preparing the material for instance. The well conditioned wetting does not interfere with the good result of the scutching.

We claim:

1. A scutching machine comprising in combination two series of scutching blades, means for supporting and moving said series of blades in front of each other within an endless track and over a substantially rectilinear stroke, such means comprising two pairs of endless chains, chain wheels for driving the chains, guides for the chains in their rectilinear stroke, driving means for rotating the chain wheels and at least one resilient coupling device between the chain wheels of one series of scutching blades and their driving means.

2. A plant for breaking and scutching flax and the like comprising as a unit: a first group of apparatus comprising a pair of endless belts having a reciprocating movement over two pairs of rollers arranged so that substantial parts of the two belts move in close contact with each other, a pair of fluted pressure rollers arranged in front of said close running parts, and a scutching machine comprising two opposite series of scutching blades, each series being mounted upon an endless conveyor, a second group of apparatus similar to the first group of apparatus mentioned herebefore, and a pair of endless conveyors arranged between both units, so that parts thereof run in close contact with each other for the purpose of conveying the flax from one unit to the other.

3. A plant for breaking and scutching flax and the like comprising a feeding device moving a layer of stalks, a set of breaking rollers in front of the feeding device, a guide plate, as a unit a first group of apparatus comprising a pair of endless belts having a reciprocating movement over two pairs of rollers arranged so that substantial parts of the two belts move in close contact with each other, a pair of fluted pressure rollers arranged in front of said close running parts, and a scutching machine comprising two opposite series of scutching blades, each series being mounted upon an endless conveyor, a second group of apparatus similar to the first group of apparatus mentioned herebefore, and a pair of endless conveyors arranged between both units, so that parts thereof run in close contact with each other for the purpose of conveying the flax from one unit to the other.

4. A plant for breaking and scutching flax and the like comprising a pair of feeding rollers for moving a layer of stalks, a rippling comb controlled by said feeding rollers, a set of breaking rollers in front of the feeding device, a guide plate, as a unit a first group of apparatus comprising a pair of endless belts having a reciprocating movement over two pairs of rollers arranged so that substantial parts of the two belts move in close contact with each other, a pair of fluted pressure rollers arranged in front of said close running parts, and a scutching machine comprising two opposite series of scutching blades, each series being mounted upon an endless conveyor, a second group of apparatus similar to the first group of apparatus mentioned herebefore, and a pair of endless conveyors arranged between both units, so that parts thereof run in close contact with each other for the purpose of conveying the flax from one unit to the other.

CHARLES DECUYPERE.
MAURICE DUJARDIN.